United States Patent
Yoshimura et al.

(10) Patent No.: US 6,858,685 B2
(45) Date of Patent: Feb. 22, 2005

(54) SOLID CATALYST COMPONENT FOR OLEFIN POLYMERIZATION, PROCESS FOR PRODUCING THE SAME, PROCESS FOR PRODUCING CATALYST FOR OLEFIN POLYMERIZATION, AND PROCESS FOR PRODUCING OLEFIN POLYMER

(75) Inventors: Ken Yoshimura, Tsukuba (JP); Shin-ichi Kumamoto, Ichihara (JP); Makoto Satoh, Ichihara (JP)

(73) Assignee: Sumitomo Chemical Company, Limited, Osaka (JP)

(*) Notice: Subject to any disclaimer, the term of this patent is extended or adjusted under 35 U.S.C. 154(b) by 0 days.

(21) Appl. No.: 10/207,762

(22) Filed: Jul. 31, 2002

(65) Prior Publication Data

US 2003/0065111 A1 Apr. 3, 2003

(30) Foreign Application Priority Data

Sep. 28, 2001 (JP) .................................. 2001-302905

(51) Int. Cl.$^7$ ................ C08F 4/02; C08F 4/42
(52) U.S. Cl. ................ 526/129; 526/123.1; 526/124.3; 526/126; 526/346; 502/87; 502/103; 502/119; 502/125; 502/127
(58) Field of Search ............... 526/348, 124.3, 526/158, 123.1, 128; 502/103, 115, 116, 126, 127, 128

(56) References Cited

U.S. PATENT DOCUMENTS 4,900,706 A 2/1990 Sasaki et al.
5,051,484 A * 9/1991 Sasaki et al. ............... 526/151
5,608,018 A * 3/1997 Ebara et al. ............... 526/119

FOREIGN PATENT DOCUMENTS

| JP | 64-38409 A | 2/1989 |
| JP | 10-212231 A | 8/1998 |
| JP | 10-212319 A * | 8/1998 |

* cited by examiner

Primary Examiner—Ling-Siu Choi
(74) Attorney, Agent, or Firm—Sughrue Mion, PLLC

(57) ABSTRACT

There is provided a process for producing a catalyst for olefin polymerization, which comprises the step of contacting (1) an organ aluminum compound, (2) an external electron donor compound and (3) a solid catalyst component obtained by a process comprising the steps of;

(i) reducing a titanium compound represented by the following formula [I] with an organomagnesium compound in the presence of a fine particle and an organosilicon compound having an Si—O bond to obtain a solid product, and (ii) contacting the solid product, a halogenocompound having halogenation ability and an internal electron donor compound to obtaining the solid catalyst component.

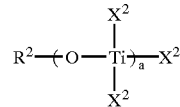

[I]

13 Claims, No Drawings

SOLID CATALYST COMPONENT FOR OLEFIN POLYMERIZATION, PROCESS FOR PRODUCING THE SAME, PROCESS FOR PRODUCING CATALYST FOR OLEFIN POLYMERIZATION, AND PROCESS FOR PRODUCING OLEFIN POLYMER

FIELD OF THE INVENTION

The present invention relates to a solid catalyst component for olefin polymerization; a process for producing the same; a process for producing a catalyst for olefin polymerization; and a process for producing an olefin polymer.

BACKGROUND OF THE INVENTION

There is known a so-called Ziegler-Natta catalyst as a catalyst for polymerization of an olefin such as ethylene, propopylene and butene-1, which catalyst is obtained by contacting a solid catalyst component obtained using a transition metal compound of the Groups 4 to 6 of the Periodic Table with an organoaluminum compound.

However, a process for producing a particulate ethylene-propylene block copolymer using such a Ziegler-Natta catalyst, which process comprises the steps of (1) polymerizing propylene alone in a gas phase to obtain a crystalline polypropylene, and (2) copolymerizing ethylene and propylene in a gas phase in the presence of the obtained crystalline polypropylene to obtain an amorphous ethylene-propylene copolymer rubber, has a problem that the block copolymer particles per se adher more easily when a content of the ethylene-propylene copolymer rubber in the block copolymer increases, and as a result, it is difficult to produce the block copolymer. Although the above-mentioned copolymer is practically a mixture of the propylene homopolymer and the ethylene-propylene copolymer, said copolymer is called a block copolymer in the field of polyolefins.

For example, JP-A 1-115909 discloses a process to solve the above-mentioned problem, which process comprises the step of using a porous substance at the time of production of the solid catalyst component for olefin polymerization. However, the solid catalyst component obtained by said process has a problem that polymerization activity per said component is markedly low, and as a result, productivity of the olefin polymer is low.

SUMMARY OF THE INVENTION

An object of the present invention is to provide (i) a process for producing a catalyst for olefin polymerization, which decreases the adhesion of the block copolymer particles per se even when a content of the ethylene-propylene copolymer rubber in the block copolymer increases, and which can produce the block copolymer with high productivity; (ii) a solid catalyst component for olefin polymerization, which can produce said catalyst, and a process for producing said solid catalyst component; and (iii) a process for producing an olefin polymer by using said catalyst.

The present invention provides:
(1) a solid catalyst component for olefin polymerization, which has a titanium atom, a magnesium atom, a chlorine atom, a fine particle, and an average primary particle diameter of at least 1.5 times an average primary particle diameter of the fine particle,
(2) a process for producing a solid catalyst component for olefin polymerization having a titanium atom, a magnesium atom, a chlorine atom, a fine particle, and an average primary particle diameter of at least 1.5 times an average primary particle diameter of the fine particle, which comprises the steps of:
 (i) reducing a titanium compound represented by the following formula [I] with an organomagnesium compound in the presence of a fine particle and an organosilicon compound having an Si—O bond to obtain a solid product, and
 (ii) contacting the solid product, a halogenocompound having halogenation ability and an internal electron donor compound with one another to obtaining the solid catalyst component for olefin polymerization,

wherein "a" is a number of 1 to 20; $R^2$ is a hydrocarbon group having 1 to 20 carbon atoms; $X^2$ is a halogen atom or a hydrocarbyloxy group having 1 to 20 carbon atoms; and all of $X^2$ may be the same or different from one another,
(3) a process for producing a solid catalyst component for olefin polymerization having a titanium atom, a magnesium atom, a chlorine atom, a fine particle, and an average primary particle diameter of at least 1.5 times an average primary particle diameter of the fine particle, which comprises the steps of:
 (i) reducing a titanium compound represented by the following formula [I] with an organomagnesium compound in the presence of an organosilicon compound having an Si—O bond, an ester compound and a fine particle to obtain a solid product, and
 (ii) contacting the solid product, a halogenocompound having halogenation ability and an internal electron donor compound with one another to obtaining the solid catalyst component for olefin polymerization,

wherein "a" is a number of 1 to 20; $R^2$ is a hydrocarbon group having 1 to 20 carbon atoms; $X^2$ is a halogen atom or a hydrocarbyloxy group having 1 to 20 carbon atoms; and all of $X^2$ may be the same or different from one another,
(4) a process for producing a catalyst for olefin polymerization, which comprises the step of contacting the solid catalyst component for olefin polymerization obtained by the process mentioned in the above item (2), an organoaluminum compound and an external electron donor compound with one another,
(5) a process for producing a catalyst for olefin polymerization, which comprises the step of contacting the solid catalyst component for olefin polymerization obtained by the process mentioned in the above item (3), an organoaluminum compound and an external electron donor compound with one another,
(6) a process for producing an olefin polymer, which comprises the step of polymerizing an olefin in the presence of the catalyst for olefin polymerization obtained by the process mentioned in the above item (4), and (7) a process for producing an olefin polymer, which comprises the step of polymerizing an olefin in the presence of the catalyst for olefin polymerization obtained by the process mentioned in the above item (5).

DETAILED DESCRIPTION OF THE INVENTION

The fine particle used in the present invention is not particularly limited in its kind, its composition, its constitutive elements and its properties such as pore volume, particle shape, density, bulk specific gravity, particle distribution and crystallinity, Examples of the fine particle are inorganic fine particles, organic fine particles, inorganic-organic composite fine particles and a combination of at least two thereof. The fine particle may be a product mechanically pulverized using a grinder such as a ball mill.

Examples of the above-mentioned inorganic fine particles are inorganic oxides such as $SiO_2$, $Al_2O_3$, $MgO$, $TiO_2$, $ZrO_2$, $FeO_3$, $Fe_2O_3$, $FeO$, $Mn_3O_4$, $MnO$, $MnO_2$, $B_2O_3$, $CaO$, $ZnO$, $BaO$, $ThO_2$, $CeO_2$, $Y_2O_3$, $Cr_2O_3$, $CoO$, $Co_3O_4$, $NiO$, $CuO$, $Cu_2O$, $Sc_2O_3$, $SnO_2$, $SnO$, $PbO$, $Pb_3O_4$, $PbO_2$, $Bi_2O_3$, $La_2O_3$, $Pr_5O_{11}$, $Nd_2O_3$, $Sm_2O_3$, $Dy_2O_3$, $Ho_2O_3$, $ER_2O_3$, $Tm_2O_3$, $V_2O_5$, $Nb_2O_5$, $Ta_2O_5$, $MoO_3$, $WO_3$, $RuO_2$, $Rh_2O_3$, $IrO_2$, $PdO$, $Ag_2O$, $CdO$, $Ga_2O_3$ and $In_2O_3$; composite inorganic oxides comprising at least two inorganic oxides mentioned above; nonmetal single substances such as graphite, black phosphorus, arsenic, antimony and bismuth; metal single substances selected from the Groups 1 to 16 elements; alloys comprising at least two metal single substances mentioned above; halogenated metals such as $FeX_2$, $MgX_2$, $CdX_2$, $AsX_3$, $VX_3$, $SrX_2$, $PbX_2$ and $AgX$ (in these formulas, X is a halogen atom); divalent metal hydroxides such as $Mg(OH)_2$, $Ca(OH)_2$, $Mn(OH)_2$ and $Fe(OH)_2$; inorganic carbonates such as $CaCO_3$, $Na_2CO_3$ and $MgCO_3$; inorganic sulfates such as $Na_2SO_4$, $CaSO_4$, $BaSO_4$, $MgSO_4$, $CuSO_4$ and $FeSO_4$; inorganic hydrogen carbonates such as $NaHCO_3$ and $KHCO_3$; transition metal chalcogenides such as $HfS_2$. $MoS_2$, $NiTe_2$, $PtSe_2$ and $ZrS_2$; the Groups 13 to 16 compounds such as $GaS$, $GaSe$, $GaTe$ and $InSe$; the Groups 14 to 16 compounds such as $PbO$, $Ge_2Te_3$, $SnO$, $SnO_2$, $SnS_2$ and $SnSe_2$; a kaolin group such as diokite, nacrite, kaolinite, anauxite, metahalloysite and halloysite; a serpentine group such as chrysotile, lizardite and antigorite; a smectites group such as montmorillonite, sauconite, beidellite, nontronite, saponite, bentonite, hectorite and stevensite: a vermiculite group such as vermiculite; a mica group such as illite, sericite and glauconite; layered silicate compounds such as attapulgite, sepiolite, palygorskite, pyrophyllite, talc, achlorite group, allophane and lmogolite; Inorganic polymers such as polyphosphazene, polythiazyl, polysilane and carbon fiber; high temperature superconductors comprising copper oxides; organic conductors comprising charge transfer complexes: organic superconductors; inorganic nitrides such as $BN$, $TiN$, $AlN$, $Fe_4N$. $Cr_2N$ and $Ta_2N$; inorganic carbides such as $SiC$, $B_4C$, $TiC$, $ZrC$ and $WC$; inorganic borides such as $AlBl_2$ and $ZrB_2$; pulverized products of glass; inorganic phosphates such as zirconium phosphate; inorganic borates such as calcium borate; and complexes of these inorganic fine particles.

Examples of the above-mentioned organic fine particles are fine particles comprising polystyrenes such as polystyrenes and styrene-divinylbenzene copolymers; polyacrylic acids such as polyacrylates and polyacrylate-divinylbenzene copolymers; polymethacrylic acids such as polymethacrylates and polymethacrylate-divinylbenzene copolymers; polyacrylonitriles such as polyacrylonitriles and acrylonitrile-divinylbenzene copolymers; polyvinyl chlorides; polyolefins such as polyethylene, polypropylene and ethylene-acrylate copolymers; polyesters; polyurethanes; polyamides; epoxy resins; polyketones; polyvinyl acetates; polyvinyl alcohols; polyethers; polyketones; polyimides; polycarbonates; and conjugated polymers such as polyacetylenes; and particles comprising organic polymers, for example, natural high polymers such as polypeptides and sacchrides.

Additional examples of the above-mentioned organic fine grain are organic compounds such as aliphatic hydrocarbons, aromatic hydrocarbons, aliphatic alcohols, aromatic alcohols, organic acids, organic acid esters, organic acid anhydrides, ether compounds, aldehyde compounds, ketone compounds, amide compounds, amine compounds, nitrila compounds, nitro compounds, sulfide compounds, sulfoxide compounds and sulfone compounds; organometal compounds; and complexes of these organic fine grains.

Examples of the above-mentioned inorganic organic composite fine particles are fine grains comprising composite products of the above-mentioned inorganic fine grain and the above-mentioned organic fine particles.

Among the fine particles mentioned above, preferred fine particles are those comprising inorganic oxides, layered silicate compounds, the smectites group, polystyrenes or polymethacrylic acids, more preferred fine particles are those comprising silica, alumina, talc or polymethacrylates, and much more preferred fine particles are those comprising alumina, talc or polymethyl methacrylate.

An average primary particle diameter of the fine particles is preferably not more than 20 $\mu$m, more preferably from 0.001 to 15 $\mu$m, and much more preferably from 0.005 to 10 $\mu$m.

An average primary particle diameter of the solid catalyst component for olefin polymerization in accordance with the present invention is at least 1.5 times, preferably from 2 to 10000 times, and more preferably from 5 to 10000 times the average primary particle diameter of the fine g particle used for the production of the solid catalyst component. When the average primary particle diameter of the solid catalyst component is least 1.5 times the average primary particle diameter of the fine particle, the solid catalyst component can contain enough amount of a catalytic activity-carrying component (namely, a component comprising a titanium atom, a magnesium atom, a chlorine atom and an internal electron donor compound) other than the fine particles and as a result, the catalyst obtained using such a solid catalyst component exhibits a superior productivity. Incidentally, it seems that the solid catalyst component disclosed in the above-mentioned JP-A 1-115909 contains only a small amount of a catalytic activity-carrying component similar to the above-mentioned catalytic activity-carrying component other than the fine particle.

When propylene is polymerized by a standard polymerization process described below using the solid catalyst component for olefin polymerization in accordance with the present invention, or using the solid catalyst component obtained by the process in accordance with the present invention, the obtained powder like polypropylene has a pore volume of not less than 0.12 ml/g preferably from 0.13 to 2 ml/g, and more preferably from 0.14 to 1 ml/g. When the solid catalyst component for olefin polymerization capable of producing such a powder like polypropylene having a large pore volume, a particulate block copolymer obtained by a process comprising the steps of 1 and 2 as described below exhibits only a little adhesion of particles per se even when a content of the rubber component in the copolymer increases. The above-mentioned "pore volume" means a pore volume (ml/g) within a pore radius of from 45 to 40000 Å measured by a mercury injection method using a porosimeter, a commercial name of PORE SIZER 9310, manufactured by Micromeritics.

The above-mentioned standard polymerization process comprises the steps of:
1. feeding 0.002 to 0.01 mg/g-liquefied propylene of the solid catalyst component, 0.00337 mmol/g-liquefied propylene of triethylaluminum (organoaluminum compound) and 0.000337 mmol/g-liquefied propylene of cyclohexylethyldimethoxysilane (electron donor compound) in an autoclave,
2. feeding hydrogen in an amount corresponding to a partial pressure of 0.33 kg/cm² therein,
3. further feeding a pre-determined amount of liquefied propylene,
4. raising a temperature of the autoclave to 80° C. and polymerizing propylene at 80° C. for 1 hour, and
5. after completion of the polymerization, releasing the unreacted monomer to stop the polymerization and obtaining the powder like polypropylene.

The "polymerization activity" in the present invention means a yield (g) of an olefin polymer per g of a solid catalyst component for olefin polymerization, namely the olefin polymer yield (g)/amount used of the solid catalyst component for olefin polymerization (g) (hereinafter referred to as "PP/Cat").

Preferable examples of the organosilicon compound having an Si—O bond used in the present invention are those represented by any one of the following formulas:

$$Si(OR^{10})_t R^{11}_{4-t},$$

$$R^{12}(R^{13}_2 SiO)_u SiR^{14}_3$$

and $$(R^{15}_2 SiO)_v$$

wherein $R^{10}$ is a hydrocarbon group having 1 to 20 carbon atoms, $R^{11}$, $R^{12}$, $R^{13}$, $R^{14}$ and $R^{15}$ are independently of one another a hydrocarbon group having 1 to 20 carbon atoms or a hydrogen atom, t is a number satisfying 0<t≦4, u is an integer of from 1 to 1000, and v is an integer of from 2 to 1000.

Specific examples of the organosilicon compound are tetramethoxysilane, dimethyldimethoxysilane, tetraethoxysilane, triethoxyethylsilane, dethoxydiethylsilane, ethoxytriethylsilane, tetra-i-propoxysilane, di-i-proposy-di-i-propylsilane, tetrapropoxysilane, dipropoxydipropylisilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethyl polysiloxane, diphenyl polysiloxane, methylhydro polysiloxane and phenylhydro polysiloxane.

Among them, more preferable are alkoxysilane compounds represented by the formula $Si(OR^{10})_t R^{11}_{4-t}$, wherein t is preferably a number satisfying 1≦b≦4. Of these, tetraalkoxysilane compounds of t=4 are particularly preferred, and the most preferred is tetraethoxysilane.

Examples of $R^2$ in the above formula [I] representing the titanium compound are alkyl groups such as methyl, ethyl, propyl, i-propyl, butyl, i-butyl, amyl, i-amyl, hexyl, heptyl, octyl, decyl and dodecyl groups; aryl groups such as phenyl, cresyl, xylyl and naphthyl groups; cycloalkyl groups such as cyclohexyl and cyclopentyl groups; allyl groups such as a propenyl group; and aralkyl groups such as a benzyl group. Among these, alkyl groups having 2 to 18 carbon atoms or aryl groups having 6 to 18 carbon atoms are preferred, and linear alkyl groups having 2 to 18 carbon atoms are particularly preferred.

As the halogen atom represented by $X^2$ in the above formula [I], a chlorine atom, a bromine atom and an iodine atom are exemplified. Of these, a chlorine atom is particularly preferred. As the hydrocarbyloxy groups having 1 to 20 carbon atoms represented by $X^2$, there are exemplified the hydrocarbyloxy groups having the same groups as $R^2$'s mentioned above. An alkoxy group having a linear alkyl group of 2 to 18 carbon atoms is particularly preferred as $X^2$.

A preferred "a" in the above formula [I] is a number satisfying 1≦a≦5. As specific examples of the titanium compound having a≧2, tetra-i-propyl polytitanate (a mixture of compounds of "a"=2~10), tetra-n-butyl polytitanate (a mixture of compounds of "a"=2~10), tetra-n-hexyl polytitanate (a mixture of compounds of "a"=2–10), tetra-n-octyl polytitanate (a mixture of compounds of "a"=2–10) and a condensate of a tetraalkoxytitanium obtained by reacting a tetralkoxytitanium with a small amount of water are exemplified.

More preferable titanium compounds are those represented by the following formula:

$$Ti(OR^2)_q X^3_{4-q}$$

wherein $R^2$ is a hydrocarbon group having 1 to 20 carbon atoms, $X^3$ is a halogen atom, and q is a number satisfying 0<q≦4, preferably 2≦q≦4, and particularly preferably q=4.

Specific examples of the titanium compound represented by the above formula are alkoxytitanium trihalides such as methoxytitanium trichloride, ethoxytitanium trichloride, butoxytitanium trichloride, phenoxytitanium trichloride and ethoxytitanium tribromide; dialkoxytitanium dihalides such as dimethoxytitanium dichloride, diethoxytitanium dichloride, dibutoxytitanium dichloride, diphenoxytitanium dichloride and diethoxytitanium dibromide; trialkoxytitaniumnmonohalides such as trimethoxytitanium chloride, triethoxytitanium chloride, tributoxytitanium chloride, triphenoxytitanium chloride and triethoxytitanium bromide; and tetraalkoxytitanium such as tetramethoxytitanium, tetraethoxytitanium, tetrabutoxytitanium and tetraphenoxytitanium.

The titanium compound represented by the above formula can be prepared by a conventional process. As a process thereof, for example, (i) a process comprising the step of reacting $Ti(OR^2)_4$ and $TiX^3_4$ in each predetermined proportion, and (ii) a process comprising the step of reacting a corresponding alcohol of $R^2 OH$ and $TiX^3_4$ in each predetermined amount are enumerated.

A titanium compound having 2 or 4 as "a" in the above formula [I] is more preferable from a viewpoint of polymerization activity of the catalyst obtained. Among them, from a viewpoint of polymerization activity of the catalyst obtained, tera-n-butyl polytitanate is much more preferable, and tetra-n-butyltitanium dimmer ortetra-n-butyltitanium tetramer are particularly preferable.

The "organomagnesium compound" used in the present invention may be any types of organomagnesium compounds having a magnesium-carbon bond. Among them, organomagnesium compounds represented by the following formulas are particularly preferable. In a Grignard compound represented by the first following formula, Mg is a magnesium atom, $R^{16}$ is a hydrocarbon group having 1 to 20 carbon atoms, and $X^5$ is a halogen atom. In a dihydrocarbyl magnesium compound represented by the following second formula, Mg is a magnesium atom, $R^{17}$ and $R^{18}$ are independently of each other a hydrocarbon group having 1 to 20 carbon atoms, and $R^{17}$ and $R^{18}$ may be the same or different from each other.

$$R^{16}MgX^5$$

or

$$R^{17}R^{18}Mg$$

Specific examples of $R^{16}$ to $R^{18}$ are alkyl, aryl, aralkyl and alkenyl groups having 1 to 20 carbon atoms such as methyl, ethyl, propyl, i-propyl, butyl, sec-butyl, tert-butyl, i-amyl, hexyl, octyl, 2-ethylhexyl, phenyl and benzyl groups. It is particularly recommendable to use the Grignard compound in the form of an ether solution thereof from a viewpoint of performance of the catalyst obtained.

It is permitted to use the organoragnesium compound in combination with an organometallic compound to form a hydrocarbon soluble complex. Examples of the organometallio compounds are compounds of Li, Be, B, Al and Zn.

It is recommendable to pre-treat the fine particle used in the present invention in order to remove a bad influence due to impurities such as water adsorbed on the fine particle, or due to an active hydrogen such as hydrogen of a hydroxyl group existing on the surface of the fine particle. As a preferred pre-treatment method, there are exemplified (i) a method comprising the step of vacuum-drying the fine particle, and (ii) a method comprising the step of contacting the fine particle with a compound having a high reactivity to water or the hydroxyl group, such as an organomagnesiun compound and an organoaluminum compound. Conditions of the above-mentioned vacuum-drying are not particularly limited, as far as those conditions cause neither fusion of the fine particle nor decomposition thereof. For example, the drying can be carried out at 0 to 1000° C. for 0.1 to 1000 hours. The above-mentioned contacting method is not particularly limited. There is exemplified a method wherein the fine particle is contacted with an organomagnesium compound or an organoaluminum compound in an amount of from about 1 to 10 mmol per g of the fine particle in an organic solvent at ambient temperature for about 1 hour. More than one pre-treatment method maybe combined to complete the pre-treatment, or a pre-treatment method may be repeated several times to complete the pre-treatment.

As the ester compound used in the present invention, a mono-carboxylic acid ester and a poly-carboxylic acid ester are exemplified. As the ester compound, for example, saturated aliphatic carboxylic acid esters, unsaturated aliphatic carboxylic acid esters, alicyclic carboxylic acid esters and aromatic carboxylic acid esters are enumerated.

Specific examples of the ester compounds are methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, di-i-propyl phthalate, di-n-butyl phthalate, di-i-butyl phthalate, di-n-octyl phthalate and diphenyl phthalate.

Among these ester compounds, unsaturated aliphatic carboxylic acid esters such as methacrylic acid esters and maleic acid esters, and aromatic carboxylic acid esters such as phthalic acid esters are preferred. Dialkyl phthalates are particularly preferred.

The titanium compound, the organosilicon compound, the fine particle and the ester compound are preferably dissolved in, diluted with, dispersed in, or suspended in a suitable solvent, and then used. Examples of the solvent are aliphatic hydrocarbons such as hexane, heptane, octane and decane; aromatic hydrocarbons such as toluene and xylene; alicyclic hydrocarbons such as cyclohexane, methylcyclohexane and decalin; and ether compounds such as diethyl ether, dibutyl ether, di-i-amyl ether and tetrahydrofuran. Among them, aliphatic hydrocarbons such as hexane, heptane, octane and decane; and aromatic hydrocarbons such as toluene and xylene are preferable, and hexane is particularly preferable.

A temperature of the reduction reaction is usually from −50 to 70° C., preferably from −30 to 50° C., and particularly preferably from −25 to 35° C. A time required for the reduction reaction is not particularly limited, and it is usually from about 30 minutes to about 6 hours. After the reaction is carried out at the above-mentioned temperature, it is permitted to further carry out a post-reaction at a temperature of from 20 to 120° C.

The fine particle in the process for producing a solid catalyst component for olefin polymerization according to the present invention is used in an amount of usually from 0.1 to 1.5 g, and preferably from 0.3 to 1.2 g per mmol of a titanium atom contained in the titanium compound used.

The organosilicon compound In the process for producing a solid catalyst component for olefin polymerization according to the present invention is used in an amount of usually from 1 to 500, preferably from 1 to 300, and more preferably from 3 to 100 in terms of an atomic ratio, Si/Ti, i.e. a ratio of a silicon atom in the organosilicon compound to a titanium atom in the titanium compound used.

The organomagnesium compound in the process for producing a solid catalyst component for olefin polymerization according to the present invention is used in an amount of usually from 0.1 to 10, preferably from 0.2 to 5.0, and more preferably from 0.5 to 2.0 in terms of an atomic ratio, (Ti+Si)/Mg, i.e. a ratio of the sum of a titanium atom in the titanium compound used and a silicon atom in the organosilicon compound used to a magnesium atom in the organomagnesium compound.

Each of the titanium compound, the organosilicon compound and the organomagnesium compound may be used in an amount of usually from 1 to 51, preferably from 2 to 31, and particularly preferably from 4 to 26 in terms of an atomic ratio, Mg/Ti, i.e. a ratio of a magnesium atom in the solid catalyst component obtained to a titanium atom therein.

When the ester compound is used in the present invention, the ester compound in the process for producing a solid catalyst component for olefin polymerization according to the present invention is used in an amount of usually from 0.5 to 100, preferably from 1 to 60, and particularly preferably from 2 to 30 in terms of a molar ratio, ester compound/Ti, i.e. a ratio of the ester compound used to a titanium atom in the titanium compound used.

The solid product obtained by the reduction reaction is usually separated by solid-liquid separation, and washed several times with an inert hydrocarbon solvent such as hexane, heptane and toluene.

The halogenocompound having halogenation ability used in the present invention may be any compound having halogenation ability to the above-mentioned solid product. Preferable examples of the halogenocompound are an organic acid halide, a halogenocompound of the Group 4 elements, a halogenocompound or the Group 13 elements, a halogenocompound of the Group 14 elements, and a combination of two or more thereof.

A preferable organic acid halide is mono- or polycarboxylic acid halides. As the organic acid halides, for example, aliphatic carboxylic acid halides, alicyclic carboxylic acid halides and aromatic carboxylic acid halides are enumerated.

Specific examples of the organic acid halides are acetyl chloride, propionic chloride, butyric chloride, valeric chloride, acrylic chloride, methacrylic chloride, benzoic chloride, toluic chloride, anisic chloride, succinic chloride, malonic chloride, maleic chloride, itaconic chloride and phthalic chloride. Of these, aromatic carboxylic acid chlorides such as benzoic chloride, toluic chloride and phthalic chloride are preferred. Aromatic dicarboxylic acid dichlorides are more preferred, and phthalic chloride is particularly preferred.

As the above-mentioned halogenocompound of the Group 4 elements, halogenocompounds of titanium are preferable. Among them, a titanium compound represented by the following formula is more preferable:

$$Ti(OR^9)_b X^4_{4-b}$$

wherein $R^9$ is a hydrocarbon group having 1 to 20 carbon atoms, $X^4$ is a halogen atom, and b is a number satisfying $0 \leq b < 4$, preferably $0 \leq b \leq 2$, and particularly preferably $b=0$.

Examples of $R^9$ are alkyl groups such as methyl, ethyl, propyl, i-propyl, butyl, i-butyl, tert-butyl, amyl, i-amyl, tert-amyl, hexyl, heptyl, octyl, decyl and dodecyl groups; aryl groups such as phenyl, cresyl, xylyl and naphthyl groups; allyl groups such as propenyl group; and aralkyl groups such as a benzyl group. Among these $R^9$, alkyl groups having 2 to 18 carbon atoms and aryl groups having 6 to 18 carbon atoms are preferred, and linear alkyl groups having 2 to 18 carbon atoms are particularly preferred. As the compound represented by the above formula, it is allowed to use those having two or more $OR^9$ groups different from one another.

As $X^4$ in the above formula, a chlorine atom, a bromine atom and an iodine atom are exemplified. Of these, a chlorine atom is particularly preferred.

Specific examples of the titanium compound represented by the above formula are titanium tetrahalides such as titanium tetrachloride, titanium tetrabromide and titanium tetraiodide; alkoxytitanium trihalildes such as methoxytitanium trichloride, ethoxytitanium trichloride, butoxytitanium trichloride, phenoxytitanium trichloride and ethoxytitanium tribromide; and dialkoxytitanium dihalides such as dimethoxytitanium dichloride, diethoxytitanium dichloride, dibutoxytitanium dichloride, diphenoxytitanium dichloride and diethoxytitanium dibromide. Among these titanium compounds, the most preferred is titanium tetrachloride.

The above-mentioned "halogenocompound of the Group 13 elments" means a compound having at least one Group 13 element-halogen bond. The above-mentioned "halogenocompound of the Group 14 elements" means a compound having at least one Group 14 element-halogen bond. As such compounds, preferred are those represented by the following formula. In the formula, M is the Group 13 or 14 element, $R^{27}$ is a hydrocarbon group having 1 to 20 carbon atoms, $X^6$ is a halogen atom, m is a valence of M, and n is a number satisfying $0 < n \leq m$.

$$MR^{27}_{m-n} X^6_n$$

As the Group 13 element in the above formula, B, Al, Ga, In and Tl are exemplified. Of these, preferred is B or Al, and more preferred is Al. As the Group 14 element, C, Si, Ge, Sn and Pb are exemplified. Of these, preferred is Si, Ge or Sn. As M, the Group 14 element is particularly preferred, and Si is the most preferred. When M is, for example, Si, m is 4, and preferred n is 3 or 4.

As $R^{27}$ in the above fonmula, there are exemplified alkyl groups such as a methyl group, an ethyl group, a n-propyl group, an isopropyl group, a n-butyl group, an isobutyl group, an amyl group, an isoamyl group, a hexyl group, a heptyl group, an octyl group, a decyl group and a dodecyl group; aryl groups such as a phenyl group, a tolyl group, a cresyl group, a xylyl group and a naphthyl group; cycloalkyl groups such as a cyclohexyl group and cyclopentyl group; allyl groups such as a propenyl group; and aralkyl groups such as a benzyl group. Of these, alkyl groups or aryl groups are preferred, and a methyl group, an ethyl group, a n-propyl group, a phenyl group or a p-tolyl group is particularly preferred.

As the halogenocompound of the above-mentioned Group 13 elements, there are exemplified trichloroboron, methyldichloroboron, ethyldichloroboron, phenyldichloroboron, cyclohexyldichloroboron, dimethylchloroboron, methylethylchloroboron, trichloroaluminum, methyldichloroaluminum, ethyldichloroaluminum, phenyldichloroaluminum, cyclohexyldichloroaluminum, dimethylchloroaluminum, diethylchloroaluminum, methylethylchloroaluminum, ethylaluminum sesquichloride, gallium chloride, gallium dichloride, trichlorogallium, methyldichlorogallium, ethyldichlorogallium, phenyldichlorogallium, cyclohexyldichlorogalltum, methylchlorogallium, methylethylchlorogallium, indium chloride, indium trichloride, methylindium dichloride, phenylindium dichloride, dimethylindium chloride, thallium chloride, thallium trichloride, methylthallium dichloride, phenylthallium dichlorlde, dimethylthallium chloride, and compounds formed by replacing the chloro in the above compounds with fluoro, bromo or iodo.

Specific examples of the above-mentioned halogenocompounds of the group 14 element are tetrachloromethane, trichloromethane, dichloromethane, monochloromethane, 1,1,1-trichloroethane, 1,1-dichloroethane, 1,2-dichloroethane, 1,1,2,2-tetrachloroethane, tetrachlorosilane, trichlorosilane, methyltrichlorosilane, ethyltrichlorosilane, n-propyltrichlorosilane, n-butyltrichlorosilane, phenyltrichlorosilane, benzyltrichlorosilane, p-tolyltrichlorosilane, cyclohexyltrichlorosilane, dichlorosilane, methyldichlorosilane, ethyldichlorosilane, dimethyldichlorosilane, diphenyldichlorosilane, methylethyldichlorosilane, monochlorosilane, trimethylchlorosilane, triphenylchlorosilane, tetrachlorogermane, trichlorogermane, methyltrichlorogermane, ethyltrichlorogermane, phenyltrichlorogermane, dichlorogermane, dimethyldichlorogermane, diethyldichlorogermane, diphenyldichlorogermane, monochlorogermane, trimethylchlorogermane, triethylchlorogermane, tri-n-butylchlorogermane, tetrachlorotin, methyltrichlorotin, n-butyltrichlorotin, dimethyldichlorotin, di-n-butyldichlorotin, di-i-butyldichlorotin, diphenyldichlorotin, divinyldichlorotin, methyltrichlorotin, phenyltrichlorotin, dichlorolead, methylclorolead and phenylchlorolead, and compounds named by replacing the chloro in the above named compounds with F, Br and I, respectively.

Among these compounds, tetrachlorosilane, phenyltrichlorosilane, methyltrichlorosilane, ethyltrichlorosilane, n-propyltrichlorosilane or p-tolyltrichlorosilane is particularly preferred from a viewpoint of polymerization activity.

Examples of the internal electron donor compound used in the present invention are oxygen-containing compounds such as ethers including diethers, ketones, aldehydes, carboxylic acids, organic acid esters, inorganic acid esters, organic acid amides, inorganic acid amides and acid anhydrides; and nitrogen-containing compounds such as ammonia, amines, nitriles and isocyanates. Of these, organic acid esters, ethers or a combination thereof are preferred, and carboxylic acid esters or a combination of carboxylic acid esters with ethers are more preferred.

As the carboxylic acid esters, for example, mono-carboxylic acid esters and poly-carboxylic acid esters are enumerated. More secifically, saturated aliphatic carboxylic acid esters, unsaturated aliphatic carboxylic acid esters, alicyclic carboxylic acid esters and aromatic carboxylic acid esters are enumerated.

Specific examples of the above-mentioned carboxylic acid esters are methyl acetate, ethyl acetate, phenyl acetate, methyl propionate, ethyl propionate, ethyl butyrate, ethyl valerate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, di-i-propyl phthalate, di-n-butyl phthalate, di-i-butyl phthalate, di-n-octyl phthalate and diphenyl phthalate. Among these carboxylic acid esters, unsaturated aliphatic carboxylic acid esters such as methacrylic acid esters and maleic acid esters, and aromatic carboxylic acid esters such as benzoic acid esters and phthalic acid esters are preferred. Aromatic poly-carboxylic acid esters are particularly preferred, and dialkyl phthalates are most preferred.

Preferable examples of the above-mentioned ethers are dialkyl ethers, diethers represented by the following formula and a combination of two or more thereof:

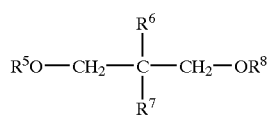

wherein $R^5$ to $R^8$ are independently of one another a linear alkyl group, a branched alkyl group, an alicyclic group, an aryl group or an aralkyl group having 1 to 20 carbon atoms, provided that $R^6$ and $R^7$ may be independently of each other a hydrogen atom.

Preferable examples of the ethers are dimethyl ether, diethyl ether, di-n-butyl ether, methyl ethyl ether, methyl-n-butyl ether, methyl cyclohexyl ether, 2,2-di-i-butyl-1,3-dimethoxypropane, 2-i-propyl-2-i-pentyl-1,3-dimethoxypropane, 2,2-bis(cyclohexylmethyl)-1,3-dimethoxypropane, 2-i-propyl-2-3,7-dimethyloctyl-1,3-dimethoxypropane, 2,2-di-i-propyl-1,3-dimethoxypropane, 2-i-propyl-2-cyclohoxylmethyl-1,3-dimethoxypropane, 2,2-dicyclohexyl-1,3-dimethoxypropane, 2-i-propyl-2-i-butyl-1,3-dimethoxypropane, 2,2-di-i-propyl-1,3-dimethoxypropane, 2,2-di-propyl-1,3-dimethoxypropane, 2-i-propyl-2-cyclohexyl-1,3-dimethoxypropane, 2-i-propyl-2-cyclopentyl-1,3-dimethoxypropane, 2,2-di-cyclopentyl-1,3-dimethoxypropane and 2-heptyl-2-pentyl-1,3-dimethoxypropane, and a combination of two or more thereof.

As the ethers, dialkyl ethers are particularly preferred, and di-n-butyl ethers are most preferred. Hereinafter, di-n-butyl ethers is simply referred to as dibutyl ether or butyl ether.

As a process for contacting the solid product, the halogenation ability-carrying halogenocompound and the internal electron donor compound with one another in the process for producing the solid catalyst component for olefin polymerization in accordance with the present invention, there are exemplified conventional processes such as a slurry process and a process using a mechanical pulverization means such as a ball mill. Among these, a slurry process comprising the step of contacting in the presence of a diluent is preferred from a viewpoint that the solid catalyst component does not contain a large quantity of a fine particle. Incidentally, the process using a mechanical pulverization means is not preferred from an industrial point of view, because the obtained solid catalyst component contains a large quantity of a fine powder, and as a result, a particle distribution may be broad.

The above-mentioned diluent is preferably inert to the solid to be treated. Examples of the diluent are aliphatic hydrocarbons such as pentane, hexane, heptane and octane; aromatic hydrocarbons such as benzene, toluene and xylene; alicyclic hydrocarbons such as cyclohexane and cyclopentane; and halogenated hydrocarbons such as 1,2-dichloroethane and monochlorobenzene.

As the number of the above-mentioned contact, there are exemplified (i) one time contact, wherein respective pre-determined total amounts of the solid product, the halogenation ability-carrying halogenocompound and the internal electron donor compound are used at the same time, (ii) more than one time contact, wherein a pre-determined total amount of at least one component among said three components is divided into plural portions, and each portion is used for one time contact, and (iii) more than one time contact, wherein at least two kinds of compounds are used as at least one of the halogenocompound and the internal electron donor compound, and each compound of at least two kinds of compounds mentioned above is used for one time contact.

Although the solid catalyst component obtained by the above-mentioned contact maybe subjected to successive treatment as it is, it is recommendable to wash the solid catalyst component with the above-mentioned diluent to remove surplus materials.

The solid catalyst component produced by the above-mentioned process and separated by solid-liquid separation is usually washed several times with an inert hydrocarbon solvent such as hexane and heptane before use for the polymerlzation. From a view point of polymerization activity and stereospecific polymerization ability of the catalyst obtained, it is particularly recommendable to wash the solid catalyst component separated by solid-liquid separation at 50 to 120° C. at least one time with a large quantity of a halogenated hydrocarbon solvent such as monochlorobenzene or an aromatic hydrocarbon solvent such as toluene, and further wash several times with an aliphatic hydrocarbon solvent such as hexane, before use for the polymerization.

In the above-mentioned contact, an amount of the diluent used per contact is usually from 0.1 ml to 1000 ml, and preferably from 1 ml to 100 ml, per g of the solid contacted.

In the above-mentioned washing, an amount of the solvent used per washing is usually from 0.1 ml to 1000 ml, and preferably from 1 ml to 100 ml, per g of the solid washed. Washing is carried out usually from 1 to 5 times per contact.

A temperature at which contacting and washing are carried out is usually from –50 to 150° C., preferably from 0 to 140° C., and more preferably from 60 to 135° C.

A contact time is not particularly limited, and preferably from 0.5 to 8 hours, and more preferably from 1 to 6 hours. A washing time also is not particularly limited, and preferably from 1 to 120 minutes, and more preferably from 2 to 60 minutes.

An amount used of the halogenation ability-carrying halogenocompound is usually from 1 to 2000 mol, preferably from 5 to 1000 mol, and more preferably from 10 to 800 mol, per mol of the titanium atom contained in the solid product.

An amount used of the internal electron donor compound is usually from 0.1 to 50 mol, preferably from 0.3 to 30 mol, and more preferably from 0.5 to 20 mol, per mol of the titanium atom contained in the solid product.

The "organoaluminum compound" used in the present invention means a compound having at least one Al-carbon bond in the molecule. Typical examples thereof are those represented by the following formulas:

$R^{19}_w AlY_{3-w}$ and

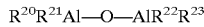
$R^{20}R^{21}Al$—O—$AlR^{22}R^{23}$ wherein $R^{19}$ to $R^{23}$ are independently of one another a hydrocarbon group having 1 to 20 carbon atoms, Y is a halogen atom, a hydrogen atom or an alkoxy group, and w is a number satisfying $2 \leq w \leq 3$.

Specific examples of the organoaluminum compound represented by the above formulas are trialkylaluminums such as triethylaluminum, tri-i-butylaluminum and trihexylaluminum; dialkylaluminum hydrides such as diethylaluminum hydride and di-i-butylaluminum hydride; dialkylaluminum halides such as diethylaluminum chloride; mixtures of trialkylaluminums and dialkylaluminum halides such as a mixture of triethylaluminum and diethylaluminum chloride; and alkylalumoxanes such as tetraethyldialumoxane and tetrabutyldialumoxane. Among these, trialkylaluminums, mixtures of trialkylaluminums and dialkylaluminum halides and alkylalumoxanes are preferred. Triethylaluminum, tri-i-butylaluminum, a mixture of triethylaluminum and diethylaluminum chloride, and tetraethyldialumoxane are particularly preferred.

As the external electron donor compound used in the present invention, for example, oxygen-containing electron donor compounds such as ethers including diethers, ketones, aldehydes, carboxylic acids, organic acid esters, inorganic acid esters, organic acid amides, inorganic acid amides and acid anhydrides; and nitrogen-containing electron donor compounds such as ammonia, amines, nitrites and isocyanates are enumerated. Of these, inorganic acid esters or diethers are preferred; alkoxysilicon compunds represented by the following former formula are more preferred; and alkoxysilicon compunds represented by the following latter formula are particularly preferred.

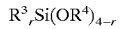
$R^3_r Si(OR^4)_{4-r}$

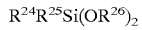
$R^{24}R^{25}Si(OR^{26})_2$

In the above former formula, $R^3$ is a hydrocarbon group having 1 to 20 carbon atoms or a hydrogen atom, $R^4$ is a hydrocarbon atoms having 1 to 20 carbon atoms, r is a number satisfying $0 \leq r < 4$, and all of R3 and all of $R^4$ are the same or different from one another.

In the above latter formula, $R^{24}$ is a $C_{3-20}$ hydrocarbon group, whose carbon atom adjacent to Si is secondary or tertiary.

As $R^{24}$, for example, branched chain alkyl groups such as isopropyl, sec-butyl, tert-butyl and tert-amyl groups; cyoloalkyl groups such as cyclobutyl, cyclopentyl and cyclohexyl groups; cycloalkenyl groups such as a cyclopentenyl group; and aryl groups such as pheny and tolyl groups are enumerated.

In the above latter formula, $R^{25}$ is a $C_{1-20}$ hydrocarbon group. As $R^{25}$, for example, linear alkyl groups such as methyl, ethyl, propyl, butyl and pentyl groups; branched chain alkyl groups such as isopropyl, sec-butyl, tert-butyl and tert-amyl groups; cycloalkyl groups such as cyclopentyl and cyclohexyl groups; cycloalkenyl groups such as a cyclopentenyl group; and aryl groups such as pheny and tolyl groups are enumerated.

In the above latter formula, $R^{26}$ is a $C_{1-20}$ hydrocarbon group, preferably a $C_{1-5}$ hydrocarbon group.

Specific examples of the above-mentioned alkoxysilicon compounds are di-i-propyldimethoxysilane, di-i-butyldimethoxysilane, di-tert-butyldimethoxysilane, tert-butylmethyldimethoxysilane, tert-butylethyl-dimethoxysilane, tert-butyl-n-ptropyldimethoxysilane, tert-butyl-n-butyldimethoxysilane, tert-amylme-thyldimethoxysilane, tert-amyl-ethyldimethoxysilane, tert-amyl-n-propyldimethoxysilane, tert-amyl-n-butyldimethoxysilane, i-butyl-i-propyl-diamethoxysilane, tert-butyl-i-propyldimethoxysilane, dicyclo-butyldimethoxysilane, cyclobutyl-i-propyldimethoxysilane, cyclobutyl-i-butyldimethoxysilane, cyclobutyl-tert-butyldimethoxysilane, dicyclopentyldimethoxysilane, cyclopentyl-i-propyldimethoxysilane, cyclopentyl-i-butyldimethoxysilane, cyclopentyl-tert-butyl-imethoxysilane, dicylohaxyldimethoxysilane, cyclohexylmethyldimethoxysilane, cyclohexyleth-yldimethoxysilane. cyclohexyl-i-propyldimethoxysilane, cyclohexyl-i-butyldimethoxysilane, cyclohexyl-tert-butyldimethoxysilane, cyclohexylcyclopen-tyldimethoxysilane, cyclohexylphenyldimethoxysilane, diphenyldimethoxysilane, phenymethyldimethoxysilane, phenyl-i-propyldimethoxysilane, phenyl-i-butyldimethoxysilane, phenyl-tert-butyldimethoxysilane, phenylcyclopentyldimethoxysilane, di-i-propyl-diethoxysilane, di-i-butyldiethoxysilane, di-tert-butyldiethoxysilane, tert-butylmethyldiethoxysilane, tert-butylethyldiethoxysilane, tert-butyl-n-propyldiethoxysilane, tert-butyl-n-butyldiethoxysilane, tert-amylmethyl-diethoxysilane, tert-amylethyldiethoxysilane, tert-amyl-n-propyldiethoxysilane, tert-amyl-n-butyldiethoxysilane, dicyclopentyldiethoxysilane, dicyclohexyldiethoxysilane, cycohexylmethyldiethoxysilane, cyclohexylethyl-diethoxysilane, diphenyldiethoxysilane, phenylmethyldi-ethoxysilane and 2-norbornanemethyldiethoxysilane.

The olefin used in the process for producing an olefin polymer in accordance with the present invention means an olefin having at least 2 carbon atoms. Examples thereof are linear mono-olefins such as ethylene, propylene, butene-1, pentene-1, haexene-1, heptene-1, octene-1 and decene-1; branched mono-olefins such as 3-methylbutene-1, 3-methylpentene-1 and 4-methylpentene-1; vinylcyclohexane; and a combination of two or more thereof.

In the present invention, preferred is a polymerization of ethylene or an α-olefin, and more preferred is a homopolymerization of ethylene, propylene or butene-1, or a copolymerization of a mixed olefin containing ethylene, propylene or butene-1 as a main component.

As the olefin polymer obtained by the process for producing an olefin polymer in accordance with the present invention, preferred are a propylene homopolymer and a copolymer of a mixed olefin containing propylene as a main component, which have a polypropylene crystal structure.

Further, as the copolymer obtained by the process for producing an olefin polymer in accordance with the present invention, there are exemplified a copolymer of at least two olefins selected from the group consisting of ethylene and the above-mentioned α-olefins; a copolymer comprising a polymerization unit of an olefin and a polymerization unit of a compound having a polyunsaturated bond such as a conjugated diene and a non-conjugated diene; and a block copolymer.

The process for producing an olefin polymer in accordance with the present invention is particularly suitable for the production of a block copolymer having a polymerization unit content of an olefin selected from the group consisting of ethylene and α-olefins having 4 to 10 carbon atoms of 1 to 20% by weight, preferably 2 to 15% by weight (a weight of the block copolymer is 100% by weight), which block copolymer is obtained by a process comprising the steps of:

1. homopolymerizing propylene to obtain a homopolypropylene, or (2) copolymerizing propylene and an olefin selected from the group consisting of ethylene and α-olefins having 4 to 10 carbon atoms to obtain a copolymer A, wherein the copolymerization is carried out so as to satisfy a condition that a polymerization unit content of said olefin in the copolymer A reaches not more than 2% by weight (a weight of the copolymer A is 100% by weight), and a copolymer A content in the block copolymer obtained in the next following step reaches from 40 to 98% by weight (a weight of the block copolymer is 100% by weight), and
2. copolymerizing propylene and an olefin selected from the group consisting of ethylene and α-olefins having 4 to 10 carbon atoms in the presence of the homopolypropylene or the copolymer A obtained in the above step to obtain a copolymer B, thereby obtaining the block copolymer, wherein the copolymerization is carried out so as to satisfy a condition that a polymerization unit content of said olefin in the copolymer B reaches from 10 to 60% by weight (a weight of the copolymer B is 100% by weight), and a copolymer B content in the block copolymer reaches from 2 to 60% by weight (a weight of the block copolymer is 100% by weight).

In the process for producing an olefin polymer in accordance with the present invention, a method for contacting the solid catalyst component for olefin polymerization, the organoaluminum compound and the external electron donor compound with one another may be any method capable of forming a catalyst. There are exemplified as such a method (1) a method comprising the step of mixing the above-mentioned components to contact them with one another before supply to a polymerization vessel, and (2) a method comprising the step of separately feeding the above-mentioned components to a polymerization vessel to contact them with one another therein, wherein the above-mentioned components may be diluted with a solvent or not.

It is desired that the feeding of the catalyst to the polymerization vessel in the above-mentioned method (1) and the feeding of the components to the polymerization vessel in the above-mentioned method (2) are carried out in an inert gas such as nitrogen or argon under water free conditions.

The catalyst obtained by the process in accordance with the present invention may be used by itself for polymerization of an olefin (said polymerization is hereinafter referred to as "real polymerization"). Alternatively, a pre-polymerized polymerization catalyst obtained by the below-mentioned pre-polymerization of the above-mentioned catalyst may be used for the real polymerization.

The pre-polymerized polymerization catalyst can usually be obtained by polymerizing (namely, pre-polymerizing) a small amount of an olefin in the presence of the above-mentioned solid catalyst component and organoaluminum compound. As a pre-polymerization process, it is recommendable to carry out a slurry polymerization process, wherein an inert hydrocarbon such as propane, butane, isobutane, pentane, isopentane, hexane, heptane, octane, cyclohexane, benzene and toluene is used as solvent. The solvent may be partially or totally replaced with a liquefied olefin.

An amount of the organoaluminum compound used in the pre-polymerization is usually from 0.5 to 700 mol, preferably from 0.8 to 500 mol, and particularly preferably from 1 to 200 mol, per mol of the titanium atom contained in the solid catalyst component.

An amount of the olefin pre-polymerized is usually from 0.01 to 1000 g, preferably from 0.05 to 500 g, and particularly preferably from 0.1 to 200 g, per g of the solid catalyst component.

A slurry concentration in the above-mentioned slurry polymerization process is preferably from 1 to 500 g-solid catalyst component/liter-solvent, and particularly preferably from 3 to 300 g-solid catalyst component/liter-solvent. A pre-polymerization temperature is preferably from −20 to 100° C., and particularly preferably from 0 to 80° C. A partial pressure of the olefin in a gas phase of the pre-polymerization is preferably from 0.01 to 20 kg/cm$^2$, and particularly preferably from 0.1 to 10 kg/cm$^2$. However, said partial pressure is not limited to an olefin, which is liquid under the pressure and at the temperature of the pre-polymerization. A pre-polymerization period of time is not particularly limited, and preferably usually from 2 minutes to 15 hours.

As a method for feeding the solid catalyst component, the organoaluminum compound and the olefin into a pre-polymerization vessel, there are exemplified (1) a method comprising the steps of feeding the solid catalyst component and the organoaluminum compound, and thereafter feeding the olefin, and (2) a method comprising the steps of feeding the solid catalyst component and the olefin, and thereafter feeding the organoaluminum compound. As a method for feeding the olefin to a polymerization vessel, there are exemplified (1) a method comprising the step of feeding the olefin successively so as to keep a pressure in the polymerization vessel to a pre-determined degree, and (2) a method comprising the step of feeding a pre-determined total amount of the olefin at the same time. In order to regulate a molecular weight of the olefin polymer obtained by the pre-polymerization, a chain transfer such as hydrogen may be used.

If desired, a partial amount or the total amount of the external electron donor compound used in the real polymerization may be used in the pre-polymerization. An amount of the external electron donor compound used in the pre-polymerization is usually from 0.01 to 400 mol, preferably from 0.02 to 200 mol, and particularly preferably from 0.03 to 100 mol, per mol of the titanium atom contained in the solid catalyst component, and usually from 0.003 to 5 mol, preferably from 0.005 to 3 mol, and particularly preferably from 0.01 to 2 mol, per mol of the organoaluminum compound.

In the pre-polymerization, a method for feeding the external electron donor compound into a pre-polymerization vessel is not particularly limited. As said a method, there are exemplified (1) a method comprising the step of feeding the external electron donor compound only, and (2) a method comprising the step of feeding a contact product between the external electron donor compound and the organoaluminum compound. The olefin used in the pre-polymerization may be the same as or different from that used in the real polymerization.

As a method for the real polymerization, there are exemplified (1) a method comprising the step of polymerizing the olefin in the presence of a catalyst obtained by contacting the solid catalyst component, the organoaluminum compound and the external electron donor compound with one another, (2) a method comprising the step of polymerizing the olefin in the presence of the pre-polymerized catalyst, and (3) a method comprising the step of polymerizing the olefin in the presence of a contact product among the pre-polymerized catalyst, the organoaluminum compound and the external electron donor compound.

An amount of the organoaluminum compound used in the real polymerization is usually from 1 to 1000 mol, and particularly preferably from 5 to 600 mol, per mol of the titanium atom contained in the solid catalyst component.

An amount of the external electron donor compound used in the real polymerization is usually from 0.1 to 2000 mol, preferably from 0.3 to 1000 mol, and particularly preferably from 0.5 to 800 mol, per mol of the titanium atom contained in the solid catalyst component, and usually from 0.001 to 5 mol, preferably from 0.005 to 3 mol, and particularly preferably from 0.01 to 1 mol, per mol of the organoaluminum compound.

A polymerization temperature in the real polymerization is usually from −30 to 300° C., and preferably from 20 to 180° C. A polymerization pressure is not particularly limited, and from an industrial or an economical point of view, it is generally from atmospheric pressure to 100 kg/cm$^2$, and preferably from about 2 to about 50 kg/cm$^2$. A polymerization manner may be either a batch type or a continuous type. As a polymerization process, there are exemplified a slurry polymerization process using an inert hydrocarbon solvent such as propane, butane, isobutane, pentane, hexane, heptane and octane; a solution polymerization process using said solvent; a bulk polymerization process using an olefin as a medium, which olefin is liquid at a polymerization temperature; and a gas phase polymerization process. In the real polymerization, a chain transfer agent such as hydrogen may be used in order to regulate a molecular weight of the olefin polymer obtained.

EXAMPLE

The present invention is explained in detail with reference to Examples and Comparative Examples as follows, but the present invention is not limited to those Examples.

Various physical properties of the polymer were measured as follows.

1. Intrinsic Viscosity ($[\eta]$, $[\eta]_P$, $[\eta]_{EP}$ or $[\eta]_{P-EP}$ (dl/g))

An intrinsic viscosity of a polymer was measured in a tetralin solvent at 135° C. using an Ubbellohde viscometer. Here, $[\eta]_P$ is an intrinsic viscosity of a homopolypropylene in a propylene-ethylene block copolymer mentioned below; $[\eta]_{EP}$ is an intrinsic viscosity of a propylene-ethylene copolymer in said block copolymer; and $[\eta]_{P-EP}$ is an intrinsic viscosity of said block copolymer.

2. Proportion of 20° C. Xylene-soluble Portion (CXS Value (% by Weight))

A proportion of a 20° C. xylene-soluble portion in a polymer was measured, provided that the total amount of a polymer was assigned to be 100% by weight. Usually, the smaller the CXS value of the polymer, the less an amorphous polymer content, which means a higher stereoregular polymer.

3. Bulk Density (g/ml)

A bulk density of a polymer was measured according to JIS K-6721 (1966).

4. Composition Analysis (1) Titanium Atom Content

The titanium atom content in a solid sample was measured according to a method comprising the steps of:

1. decomposing a solid sample with diluted sulfuric acid,
2. adding an excess amount of hydrogen peroxide aqueous solution thereto to obtain a liquid sample,
3. measuring a 410 nm characteristic absorption of the liquid sample using a double beam spectrophotometer, Type U-2001, manufactured by Hitachi, Ltd., and
4. finding the titanium atom content from the characteristic absorption obtained and a calibration curve otherwise prepared separately.

(2) Alkoxy Group Content

The alkoxy group content in a solid sample was measured according to a method comprising the steps of:

1. decomposing a solid sample with water to obtain a liquid sample,
2. measuring a content of an alcohol corresponding to the alkoxy group in the liquid sample according to a gas chromatography internal standard method, and
3. converting the alcohol content obtained into an alkoxy group content.

(3) Internal Electron Donor Content

The internal electron donor content in a solid sample was measured according to a method comprising the steps of:

1. decomposing a solid sample with water to obtain a liquid sample,
2. extracting a soluble component in the liquid sample with a saturated hydrocarbon solvent to obtain an extract, and
3. measuring a content of the internal electron donor in the liquid sample according to a gas chromatography internal standard method.

5. Pore Volume

The pore volume of a polymer was measured within a pore radius range of from 45 to 40000 Å according to a mercury injection method using a porosimeter, a commercial name of PORE SIZER 9310, manufactured by Micromeritics.

6. Falling Volume (ml/sec)

The falling volume of a powder like polymer was measured according to a method comprising the steps of:

1. falling down a powder like polymer spontaneously from a funnel (lower diameter of the funnel=8 mm, angle of the funnel=40°) used for measuring the above-mentioned bulk density,
2. measuring a weight (W) of a falling powder like polymer per unit time (g/sec), and
3. calculating the failing volume of the powder like polymer per unit time by the following equation.

Falling volume (ml/sec)=W (g/sec)/bulk density (g/ml) of powder like polymer

Example 1
(a) Pre-treatment of Fine Particle

A 200 ml flask was purged with nitrogen, and thereafter 2.63 g of alumina having an average primary particle diameter of 0.013 µm, a commercial name of $Al_2O_3$—C (manufacturing company: Degussa, sales company: Nippon Aerosil) was put therein and vacuum-dried at 150° C. for 8 hours. 12.7 Milliliters of di-n-butyl ether and 6.4 ml of a di-n-butyl ether solution of n-butylmagnesium chloride having a concentration of 2.1 mmol/ml, manufactured by Yuki Gosel Kogyo Co., Ltd. were added thereto, and the mixture was brought into contact with one another for 1 hour at ambient temperature. Thereafter solid-liquid separation was conducted. The obtained solid was washed 2 times with each 13 ml of di-n-butyl ether, further washed 2 times with each 13 ml of hexane, and thereafter vacuum-dried, thereby obtaining 2.50 g of a solid.

(b) Production of Solid Product

A 500 ml flask equipped with a stirrer and a dropping funnel was purged with nitrogen, and 2.50 g of the solid obtained in the above-mentioned (a), 67.5 ml of hexane, 2.05 ml (6.00 mol) of tetra-n-butoxytitanium and 20.0 ml (89.3 mmol) of tetraethoxysilane were put therein.

To the mixture, 45.4 ml of a di-n-butyl ether solution of n-butylmagnesium chloride having a concentration of 2.1 mmol/ml, manufactured by Yuki Gosei Kogyo Co., Ltd. was gradually dropped over 2 hours from the dropping funnel, while keeping a temperature in the flask at 5° C.

After completion of the dropping, the resulting mixture was stirred for 60 minutes at 5° C., and thereafter further stirred for 60 minutes at ambient temperature. Thereafter, solid-liquid separation was conducted. The obtained solid product was washed 3 times with each 100 ml of toluene, and the solid product washed was mixed with 50 ml of toluene, thereby obtaining 86 ml of a slurry. A concentration of the slurry was found to be 0.175 g/ml, and on the basis thereof, yield of the solid product and an alumina content in the solid product were calculated to be 15.0 g and 17% by weight, respectively.

As a result of a composition analysis using a part of the slurry, titanium atom, ethoxy group and butoxy group contents in the solid product were found to be 1.70% by weight, 29.0% by weight and 3.68% by weight, respectively.

(c) Production of Solid Catalyst Component

A 100 ml flask equipped with a stirrer, a dropping funnel and a thermometer was purged with nitrogen, 45.7 ml of the slurry obtained in the above (b) was put therein, and 19.3 ml of a supernatant thereof was taken out. A mixture of 0.8 ml (4.73 mmol) of di-n-butyl ether and 16 ml (0.146 mol) of titanium tetrachloride was added thereto, and a mixture of 1.19 ml (8.25 mmol) of phthalic acid chloride and 1.19 ml of toluene was dropped thereto over 5 minutes, while keeping the temperature of the flask at 80° C. After completion of the dropping, the temperature was raised to 115° C., and the mixture was stirred for 3 hours at 115° C. After completion of the stirring, solid-liquid separation was conducted at 115° C., and then the obtained solid was washed 3 times with each 40 ml of toluene at 115° C.

To the washed solid, a mixture of 10 ml of toluene, 0.45 ml (1.68 mmol) of diisobutyl phthalate, 0.8 ml (4.73 mmol) of di-n-butyl ether and 6.4 ml (0.0584 mol) of titanium tetrachloride was added, and the mixture was allowed to react with one another for 1 hour at 105° C. After completion of the reaction, solid-liquid separation was conducted at 105° C., and the obtained solid was washed at 105° C. 2 times with each 40 ml of toluene.

To the washed solid, a mixture of 10 ml of toluene, 0.8 ml (4.73 mmol) of di-n-butyl ether and 6.4 ml (0.0584 mol) of titanium tetrachloride was added, and the mixture was allowed to react with one another for 1 hour at 105° C. After completion of the reaction, solid-liquid separation was conducted at 105° C., and the obtained solid was washed at 105° C. 2 times with each 40 ml of toluene.

To the washed solid, a mixture of 10 ml of toluene, 0.8 ml (4.73 mmol) of di-n-butyl ether and 6.4 ml (0.0584 mol) of titanium tetrachloride was added, and the mixture was allowed to react with one another for 1 hour at 105° C. After completion of the reaction, solid-liquid separation was conducted at 105° C. The obtained solid was washed at 105° C. 3 times with each 40 ml of toluene, thereafter further washed 3 times with each 40 ml of hexane, and successively dried under reduced pressure, thereby obtaining 7.31 g of a solid catalyst component (A-1).

Titanium atom, phthalic acid ester, ethoxy group and butoxy group contents in the solid catalyst component were found to be 2.49% by weight, 10.1% by weight, 0.03% by weight and 0.05% by weight, respectively, and an average primary particle diameter thereof was found to be 24.8 µm.

(d) Polymerization of Propylene

A 3-liter stirring type stainless steel autoclave was purged with argon, and 4.86 mg of the solid catalyst component (A-1) obtained in the above (c), 2.6 mmol of triethylaluminum, and 0.26 mmol of cyclohexylethyldimethoxysilane were fed therein. Successively, hydrogen corresponding to a partial pressure of 0.33 kg/cm$^2$ was fed therein.

780 Grams of liquefied propylene was fed thereto, thereafter, a temperature of the autoclave was raised to 80° C., and polymerization was carried out for 1 hour at 80° C. After completion of the polymerization, the unreacted monomer was released to obtain a polymer. The polymer was dried under reduced pressure at 60° C. for 2 hours, thereby obtaining 110 g of powder like polypropylene. From this result, yield (PP/Cat) of the polypropylene per g of the solid catalyst component was calculated to be 110 g/4.86 mg≈22,600 (g/g).

The CXS value of the obtained polypropylene was found to be 0.92% by weight, [η] thereof was found to be 2.10 dl/g, the bulk density thereof was found to be 0.386 g/ml, and the pore volume thereof was found to be 0.193 ml/g.

Example 2
(d) Block Copolymerization

A one-liter stirring type stainless steel autoclave was purged with argon, hydrogen corresponding to a partial pressure of 0.08 MPa was introduced therein, and 10.25 mg of the solid catalyst component (A-1) obtained in Example 1 (c), 1.0 mmol of triethylaluminum, and 0.1 mmol of cyclohexylethyldimethoxysilane were fed therein.

To the mixture, 150 g of liquefied butane and 150 g of liquefied propylene were fed thereto, a temperature of the autoclave was raised to 80° C., and polymerization was carried out for 55 minutes at 80° C. After completion of the polymerization, the unreacted monomer and butane were released. From the weight difference of the autoclave before and after the polymerization, yield of powder like homopolypropylene was found to be 96 g. The homopolypropylene was found to have [η]$_P$ of 1.47 dl/g.

Successively, a temperature of the autoclave was kept at 65° C., and hydrogen corresponding to a partial pressure of 0.02 MPa, propylene corresponding to a partial pressure of 0.21 MPa and a mixed gas of ethylene and propylene (mixing ratio of ethylene/propylene=6/4 (molar ratio)) corresponding to a partial pressure of 0.49 MPa were fed therein to initiate polymerization. Polymerization was continued at 65° C. of the autoclave temperature, while continuously supplying the mixed gas to keep an inner pressure of the autoclave at 0.72 MPa. At the time when yield of an ethylene-propylene copolymer reached 36% by weight (a weight of the block copolymer obtained was assigned to be 100% by weight), unreacted monomers were released to stop the polymerization. The resulting polymer was dried under reduced pressure for 1 hour at ambient temperature, thereby obtaining 150 g of a powder like propylene-ethylene block copolymer (practically, a mixture of the homopolypropylene and the ethylene-propylene copolymer).

The block copolymer was found to have $[\eta]_{P\text{-}EP}$ of 1.96 dl/g, $[\eta]_{EP}$ of 2.83 dl/g, a bulk density of 0.406 g/ml, a weight (W) of a failing polymer per unit time of 2.28 g/sec, and a falling volume of 5.62 ml/sec.

Comparative Example 1

(b) Production of Solid Product

A 500 ml flask equipped with a stirrer and a dropping funnel was purged with nitrogen, and 270 ml of hexane, 8.2 ml (23.8 mmol) of tetra-n-butoxytitanium and 80 ml (357 mmol) of tetraethoxysilane were put therein.

To the mixture, 181 ml of a di-n-butyl ether solution of n-butylmagnesium chloride having a concentration of 2.1 mmol/ml, manufactured by Yuki Gosei Kogyo Co., Ltd. was gradually dropped over 3 hours from the dropping funnel, while keeping a temperature in the flask at 5° C.

After completion of the dropping, the resulting mixture was stirred for 1 hour at 5° C., and thereafter further stirred for 3 hours at ambient temperature. Thereafter solid-liquid separation was conducted. The obtained solid product was washed 3 times with each 200 ml of toluene, and the solid product washed was mixed with 200 ml of toluene, thereby obtaining a slurry having a concentration of 0.136 g/ml. As a result of a composition analysis relating to the slurry, titanium atom, ethoxy group and butoxy group contents in the solid product were found to be 2.06% by weight, 42.0% by weight and 3.62% by weight, respectively.

(c) Production of Solid Catalyst Component

A 100 ml flask equipped with a stirrer, a dropping funnel and a thermometer was purged with nitrogen, 59 ml of the slurry obtained in the above (b) was put therein, and 32.5 ml of a supernatant thereof was taken out.

A mixture of 0.8 ml (4.73 mmol) of di-n-butyl ether and 16 ml (0.146 mol) of titanium tetrachloride was added thereto, and successively 0.43 ml (2.98 mmol) of phthalic acid chloride was added thereto.

The temperature was raised to 115° C., and the mixture was stirred for 3 hours at 115° C. After completion of the stirring, solid-liquid separation was conducted at 115° C., and then the obtained solid was washed 3 times with each 40 ml of toluene at 115° C.

To the washed solid, a mixture of 10 ml of toluene, 0.45 ml (1.68 mmol) of diisobutyl phthalate, 0.8 ml (4.73 mmol) of di-n-butyl ether and 6.4 ml (0.0584 mol) of titanium tetrachloride was added, and the mixture was allowed to react with one another for 1 hour at 105° C. After completion of the reaction, solid-liquid separation was conducted at 105° C., and the obtained solid was washed at 105° C. 2 times with each 40 ml of toluene.

To the washed solid, a mixture of 10 ml of toluene, 0.8 ml (4.73 mmol) of di-n-butyl ether and 6.4 ml (0.0584 mol) of titanium tetrachloride was added, and the mixture was allowed to react with one another for 1 hour at 105° C. After completion of the reaction, solid-liquid separation was conducted at 105° C., and the obtained solid was washed at 105° C. 2 times with each 40 ml of toluene.

To the washed solid, a mixture of 10 ml of toluene, 0.8 ml (4.73 mmol) of di-n-butyl ether and 6.4 ml (0.0584 mol) of titanium tetrachloride was added, and the mixture was allowed to react with one another for 1 hour at 105° C. After completion of the reaction, solid-liquid separation was conducted at 105° C. The obtained solid was washed at 105° C. 3 times with each 40 ml of toluene, thereafter further washed 3 times with each 40 ml of hexane, and successively dried under reduced pressure, thereby obtaining 6.70 g of a solid catalyst component (A-2).

Titanium atom, phthalic acid ester, ethoxy group and butoxy group contents in the solid catalyst component were found to be 2.25% by weight, 10.8% by weight, 0.05% by weight and 0.16% by weight, respectively.

(d) Polymerization of Propylene

A 3-liter stirring type stainless steel autoclave was purged with argon, and 4.22 mg of the solid catalyst component (A-2) obtained in the above (c), 2.6 mmol of triethylaluminum, and 0.26 mmol of cyclohexylethyldimethoxysilane were fed therein. Successively, hydrogen corresponding to a partial pressure of 0.33 kg/cm$^2$ was fed therein.

780 Grams of liquefied propylene was fed thereto, a temperature of the autoclave was raised to 80° C., and polymerization was carried out for 1 hour at 80° C. After completion of the polymerization, the unreacted monomer was released to obtain a polymer. The polymer was dried under reduced pressure at 60° C. for 2 hours, thereby obtaining 229 g of powder like polypropylene. From this result, yield (PP/Cat) of the polypropylene per g of the solid catalyst component was calculated to be 229 g/4.22 mg≈54300 (g/g).

The CXS value of the obtained polypropylene was found to be 0.49% by weight. $[\eta]$ thereof was found to be 2.04 dl/g, the bulk density thereof was found to be 0.448 g/ml, and the pore volume thereof was found to be 0.104 ml/g.

Comparative Example 2

(d) Block Copolymerization

A one-liter stirring type stainless steel autoclave was purged with argon, hydrogen corresponding to a partial pressure of 0.08 MPa was introduced therein, and 7.35 mg of the solid catalyst component (A-2) obtained in Comparative Example 1(c), 1.0 mmol of triethylaluminum, and 0.1 mmol of cyclohexylethyldimethoxysilane were fed therein.

To the mixture, 150 g of liquefied butane and 150 g of liquefied propylene were fed thereto, a temperature of the autoclave was raised to 80° C., and polymerization was carried out for 40 minutes at 80° C. After completion of the polymerization, the unreacted monomer and butane were released. From the weight difference of the autoclave before and after the polymerization, yield of powder like homopolypropylene was found to be 106 g. The homopolypropylene was found to have $[\eta]_P$ as of 1.57 dl/g.

Successively, a temperature of the autoclave was kept at 65° C., and hydrogen corresponding to a partial pressure of 0.02 MPa, propylene corresponding to a partial pressure of 0.21 MPa and a mixed gas of ethylene and propylene (mixing ratio of ethylene/propylene=6/4 (molar ratio)) corresponding to a partial pressure of 0.49 MPa were fed therein to initiate polymerization. Polymerization was continued at 65° C. of the autoclave temperature, while continuously supplying the mixed gas to keep an inner pressure of the autoclave at 0.72 MPa. At the time when yield of an ethylene-propylene copolymer reached 34% by weight (a weight of the block copolymer obtained was assigned to be 100% by weight), unreacted monomers were released to stop the polymerization. The resulting polymer was dried under reduced pressure for 1 hour at ambient temperature, thereby obtaining 160 g of a powder like propylene-ethylene block copolymer (practically, a mixture of the homopolypropylene and the ethylene-propylene copolymer).

The block copolymer had $[\eta]_{P\text{-}EP}$ of 2.05 dl/g, $[\eta]_{EP}$ of 2.97 dl/g, a bulk density of 0.316 g/ml, a weight (W) of a falling polymer per unit time of 1.11 g/sec, and a falling volume of 3.51 ml/sec.

What is claimed is:

1. A solid catalyst component for olefin polymerization, which has a titanium atom, a magnesium atom, a chlorine atom, and a fine particle, wherein the solid catalyst component has an average particle diameter of at least 1.5 times an average particle diameter of the fine particle.

2. A process for producing a solid catalyst component for olefin polymerization having a titanium atom, a magnesium atom, a chlorine atom, and a fine particle, wherein the solid catalyst component has an average particle diameter of at least 1.5 times an average primary particle diameter of the fine particle, which comprises the steps of:
   (i) reducing a titanium compound represented by the following formula [I] with an organomagnesium compound in the presence of a fine particle and an organosilicon compound having an Si—O bond to obtain a solid product, and
   (ii) contacting the solid product, a halogenocompound having halogenation ability and an internal electron donor compound with one another to obtaining the solid catalyst component for olefin polymerization,

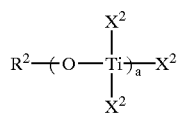

[I]

wherein "a" is a number of 1 to 20; $R^2$ is a hydrocarbon group having 1 to 20 carbon atoms; $X^2$ is a halogen atom or a hydrocarbyloxy group having 1 to 20 carbon atoms; and all of $X^2$ may be the same or different from one another.

3. The process for producing a solid catalyst component for olefin polymerization according to claim 2, wherein an amount of the fine particle in the step (i) is from 0.1 to 1.5 g per mmol of titanium contained in the titanium compound in the step (i).

4. The process for producing a solid catalyst component for olefin polymerization according to claim 2, wherein the halogenocompound having halogenation ability contains at least one halogenocompound selected from the group consisting of an organic acid halide, a compound having a Ti-halogen bond, a halogenocompound of the Group 13 elements and a halogenocompound of the Group 14 elements.

5. A process for producing a solid catalyst component for olefin polymerization having a titanium atom, a magnesium atom, a chlorine atom, and a fine particle, wherein the solid catalyst component has an average particle diameter of at least 1.5 times an average particle diameter of the fine particle, which comprises the steps of:
   (i) reducing a titanium compound represented by the following formula [I] with an organomagnesium compound in the presence of an organosilicon compound having an Si—O bond, an ester compound and a fine particle to obtain a solid product, and
   (ii) contacting the solid product, a halogenocompound having halogenation ability and an internal electron donor compound with one another to obtaining the solid catalyst component for olefin polymerization,

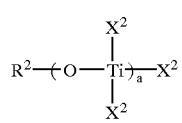

[I]

wherein "a" is a number of 1 to 20; $R^2$ is a hydrocarbon group having 1 to 20 carbon atoms; $X^2$ is a halogen atom or a hydrocarbyloxy group having 1 to 20 carbon atoms; and all of $X^2$ may be the same or different from one another.

6. The process for producing a solid catalyst component for olefin polymerization according to claim 5, wherein an amount of the fine particle in the step (i) is from 0.1 to 1.5 g per mmol of titanium contained in the titanium compound in step (i).

7. The process for producing a solid catalyst component for olefin polymerization according to claim 5, wherein the halogenocompound having halogenation ability contains at least one halogenocompound selected from the group consisting of an organic acid halide, a compound having a Ti-halogen bond, a halogenocompound of the Group 13 elements and a halogenocompound of the Group 14 elements.

8. A process for producing a catalyst for olefin polymerization, which comprises the step of contacting the solid catalyst component for olefin polymerization obtained by the process according to claim 2, an organoaluminum compound and an external electron donor compound with one another.

9. A process for producing a catalyst for olefin polymerization, which comprises the step of contacting the solid catalyst component for olefin polymerization obtained by the process according to claim 5, an organoaluminum compound and an external electron donor compound with one another.

10. A process for producing an olefin polymer, which comprises the step of polymerizing an olefin in the presence of the catalyst for olefin polymerization obtained by the process according to claim 8.

11. The process for producing an olefin polymer according to claim 10, wherein the olefin contains at least one selected from ethylene and α-olefins.

12. A process for producing an olefin polymer, which comprises the step of polymerizing an olefin in the presence of the catalyst for olefin polymerization obtained by the process according to claim 9.

13. The process for producing an olefin polymer according to claim 12, wherein the olefin contains at least one selected from ethylene and α-olefins.

* * * * *